United States Patent
Kettler et al.

(10) Patent No.: US 12,056,673 B2
(45) Date of Patent: **\*Aug. 6, 2024**

(54) SYSTEM AND METHOD FOR PAYMENT TENDER STEERING

(71) Applicant: Worldpay, LLC, Symmes Township, OH (US)

(72) Inventors: Dennis A. Kettler, Lebanon, OH (US); Scott Wayne DeAngelo, Mason, OH (US)

(73) Assignee: Worldpay, LLC, Symmes Township, OH (US)

( * ) Notice: Subject to any disclaimer, the term of this patent is extended or adjusted under 35 U.S.C. 154(b) by 119 days.

This patent is subject to a terminal disclaimer.

(21) Appl. No.: 17/554,127

(22) Filed: Dec. 17, 2021

(65) Prior Publication Data

US 2022/0108286 A1 Apr. 7, 2022

Related U.S. Application Data

(63) Continuation of application No. 16/696,501, filed on Nov. 26, 2019, which is a continuation of application
(Continued)

(51) Int. Cl.
*G06Q 20/00* (2012.01)
*G06Q 20/10* (2012.01)
(Continued)

(52) U.S. Cl.
CPC ......... *G06Q 20/102* (2013.01); *G06Q 20/227* (2013.01); *G06Q 20/363* (2013.01)

(58) Field of Classification Search
CPC .................................................. G06Q 20/227
(Continued)

(56) References Cited

U.S. PATENT DOCUMENTS 9,830,587 B1 11/2017 Bell et al.
2010/0082445 A1* 4/2010 Hodge ................... G06Q 20/20
705/35

(Continued)

FOREIGN PATENT DOCUMENTS

JP 2002190068 A * 7/2002

OTHER PUBLICATIONS

Authors: Andriatama Bagaskara et al; Title: Development of Smart Restaurant Application for Dine-In; Pub; IEEE; Date of Conference: Oct. 28-28, 2021; (Year: 2021).*
Authors: Christine De Silva et al; Title: Smart Platform for Fuel Loyalty Programs: Potential Opportunities and Digital Road Ahead ; Date of Conference: Nov. 18-19, 2019 (Year: 2019).*
(Continued)

*Primary Examiner* — Bruce I Ebersman
*Assistant Examiner* — Hatem M Ali
(74) *Attorney, Agent, or Firm* — Bookoff McAndrews, PLLC

(57) ABSTRACT

A payment system reduces transaction costs for online merchants. The payment system receives a transaction amount for the purchase of goods or services by a consumer from an online merchant. The payment system receives bank identification numbers for a plurality of accounts of the consumer that could be used by the consumer to pay for the good or services. The payment system determines transaction costs associated with processing a payment transaction with an acquirer processor using each of the consumer accounts. The payment system determines a recommended consumer account to use for the purchase of the good or services based at least in part on the transaction costs. Tender steering information is generated and sent to the consumer. Tender steering information includes the recommended consumer account information and one or more incentives to incentivize the consumer to use the recommended consumer account for the payment of the goods or services.

9 Claims, 5 Drawing Sheets

Related U.S. Application Data

No. 14/987,130, filed on Jan. 4, 2016, now Pat. No. 10,528,926.

(51) Int. Cl.
*G06Q 20/22* (2012.01)
*G06Q 20/36* (2012.01)

(58) Field of Classification Search
USPC .......................................................... 705/40
See application file for complete search history.

(56) References Cited

U.S. PATENT DOCUMENTS

| | | | |
|---|---|---|---|
| 2012/0136780 A1 | 5/2012 | El-Awady et al. | |
| 2013/0246258 A1* | 9/2013 | Dessert | G06Q 20/3226 705/16 |
| 2014/0074655 A1* | 3/2014 | Lim | G06Q 20/3265 705/26.1 |
| 2014/0129357 A1* | 5/2014 | Goodwin | G06Q 30/02 705/16 |
| 2016/0328704 A1 | 11/2016 | Priest | |
| 2017/0109699 A1* | 4/2017 | Mowry | G06Q 10/103 |

OTHER PUBLICATIONS

Authors: Sung Ho Ha et al; Title: Helping online customers decide through Web personalization; IEEE Xplore; Date of Publication: Nov.-Dec. 2002 (Year: 2002).*

Authors: Zheng Xiao et al; Title: Nonparametric Regression for MU-MIMO Channel Prediction: From KNN to Local Linear Regression; Date of Publication: Aug. 14, 2023 (Year: 2023).*

Qing-Pang, Ni et al, "The B to C Shopping Website Open Platform and an Associate Strategy", Publisher: IEEE, https://ieexplore.ieee.org/document/6382644?source=IQplus (Year: 2012).

Dai, Xiaoling et al., "Comparing And Contrasting Micro-Payment Models For E-commerce Systems", Publisher: IEEE, https://ieeexplore.ieee.org/document/983001?source=IQplus;Date Added to IEEE Xplore: Aug. 6, 2002 (Year: 2002).

"Tabacco Data On Women's Apparel Online Sales Of Consumer Behavior Analysis", Publisher: IEEE; Date of Conference: Aug. 16-18, 2011 and Added to IEEE Xplore: Aug. 30, 2011: https://ieexplore.ieee.org/document/6006441?source=IQplus (Year: 2011).

Authors: Mohammed Ennafiri et al; Title: Towards Secure Transactions with IoT: An Advanced Smart Payment Solution; Pub: IEEE; Date of Conference: May 18-19, 2023 (Year: 2023).

Authors: W. Song et al; Title: An Investigation on Multiple e-Payments and Micro-Payment—A Technical and Market View; Pub: IEEE; Date of Conference: Apr. 15-19, 2002 (Year: 2002).

* cited by examiner

SYSTEM AND METHOD FOR PAYMENT TENDER STEERING

CROSS-REFERENCE TO RELATED APPLICATION(S)

This patent application is a continuation of and claims the benefit of priority to U.S. patent application Ser. No. 16/696,501, filed on Nov. 26, 2019, which is a continuation of U.S. patent application Ser. No. 14/987,130, filed on Jan. 4, 2016, now U.S. Pat. No. 10,528,926, granted Jan. 7, 2020, each of which is incorporated herein by reference in their entireties.

TECHNICAL FIELD

The subject application teaches example embodiments that relate generally to steering consumer payment options during checkout with online merchants.

BACKGROUND

Online merchants can accept payments from consumers for goods and services using a variety of different payment options. For example, online merchants can accept credit cards, debit cards, bank transfers, payment options from a consumer's digital wallet, or by payment from online payment services such as PayPal™, among other suitable payment options. Online merchants are charged various fees by payment providers. The amount of fees can vary from payment provider to payment provider and can include a fixed fee as well as a fee based on the amount of the transaction.

SUMMARY

In an example embodiment, a payment processing system includes an embedded controller with a processor, memory, and network interface. The memory is operable for storing data and instructions. The network interface is configured for data communication with a payment processing network that includes an acquirer processor. The embedded controller is configured to receive a transaction amount for the purchase of goods or services from a merchant by a consumer. The embedded controller is further configured to receive information about payment methods associated with the consumer that can be used for payment of the transaction amount for the goods or services. The embedded controller is further configured to determine transaction costs for the plurality of payment methods or for a subset of the payment methods. The embedded controller is further configured to identify a recommended payment method to send to the consumer with tender steering information. The tender steering information comprises the recommended payment method and at least one incentive to incentivize the consumer to use the recommended payment method. The embedded controller can be configured to generate and send the tender steering information to the consumer.

In an example embodiment, a method includes receiving, by a payment system, a transaction amount for payment of goods or services to a merchant by a consumer. The method includes receiving, by the payment system, information associated with payment methods associated with the consumer for payment of the transaction amount. The method includes determining, by the payment system, transaction costs for the payment methods or a subset of the payment methods. The method includes sending, by either the payment system or the merchant, tender steering information which is based at least in part on the determined transaction costs.

In an example embodiment, a computer-implemented method includes receiving from an online merchant system, a transaction amount for the purchase of good or service by a consumer. The method includes querying for bank identification numbers associated with the consumer. The method includes receiving identification of bank identification numbers of the consumer in response to the querying. The method includes determining transaction costs associated with processing a payment transaction with an acquirer processor for the amount of the transaction for each of the bank identification numbers. The method includes determining a recommended bank identification number based at least in part on the transaction costs. The method includes generating tender steering information that includes the recommended bank identification number and sending the tender steering information to the consumer.

BRIEF DESCRIPTION OF THE DRAWINGS

It is believed that certain embodiments will be better understood from the following description taken in conjunction with the accompanying drawings, in which like references indicate similar elements and in which.

DETAILED DESCRIPTION

Figure 1:
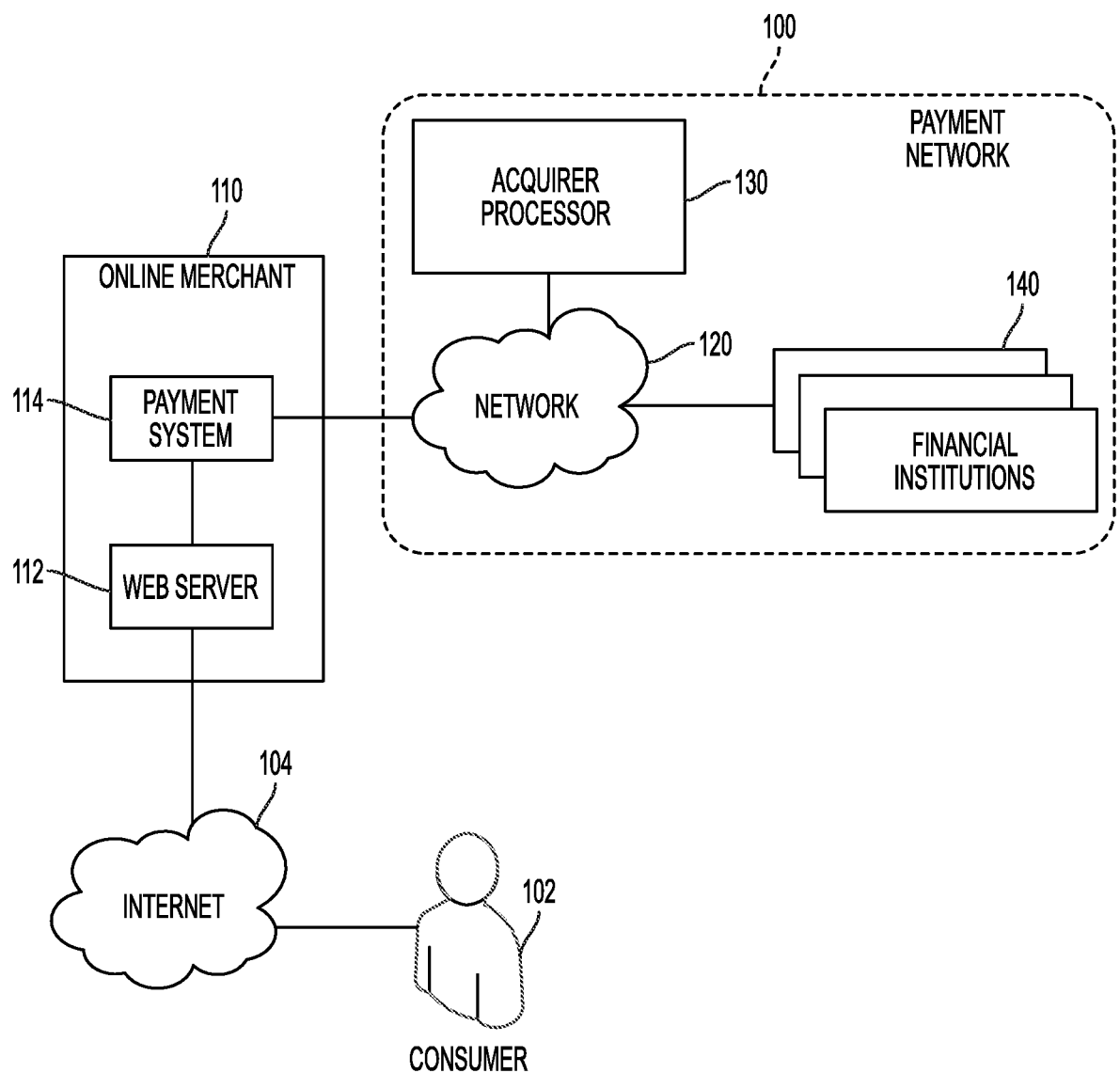
FIG. 1 is a diagram of an example point of sale terminal and an associated payment processing network.

Various non-limiting embodiments of the present disclosure will now be described to provide an overall understanding of the principles of the structure, function, and use of systems, apparatuses, devices, and methods disclosed herein. One or more examples of these non-limiting embodiments are illustrated in the selected examples disclosed and described in detail with reference made to the figures in the accompanying drawings. Those of ordinary skill in the art will understand that systems, apparatuses, devices, and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

The systems, apparatuses, devices, and methods disclosed herein are described in detail by way of examples and with reference to the figures. The examples discussed herein are examples only and are provided to assist in the explanation of the apparatuses, devices, systems and methods described herein. None of the features or components shown in the drawings or discussed below should be taken as mandatory for any specific implementation of any of these apparatuses, devices, systems or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated by those of ordinary skill in the art that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment," or "in an embodiment" in places throughout the specification are not necessarily all referring to the same embodiment. Furthermore, the particular features, structures or characteristics may be combined in any suitable manner in one or more embodiments.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. It should be noted that although for clarity and to aid in understanding some examples discussed herein might describe specific features or functions as part of a specific component or module, or as occurring at a specific layer of a computing device (for example, a hardware layer, operating system layer, or application layer), those features or functions may be implemented as part of a different component or module or operated at a different layer of a communication protocol stack.

Online payment processing systems used by merchants generally accept payments from consumers in the form credit cards, debit cards, bank transfers, by selection of a particular payment option from a digital wallet, or by payment from online payment services such as PayPal™, and so forth. Payment processing systems can be specialized computing devices configured to send and receive financial transaction data with a payment network provider such as an acquirer processor. Acquirer processors similarly can use specialized computing devices configured to send, receive, and process financial transaction data.

Referring to FIG. 1, a consumer 102 can use the Internet 104 to purchase goods or services from an online merchant 110. The online merchant 110 can host a web page or otherwise provide an interface for an application, such as a mobile app, for consumers 102 to purchase the goods and services. For example, an online merchant 110 can have a web server 112 that in communication with the Internet 104 that serves web pages to consumer 102. In a configuration, the online merchant 110 can have the web server 112 and related processes performed by a third party provider as would be understood by the one of ordinary skill in the art.

When the consumer 102 decides to purchase the goods or services, the consumer typically selects a checkout feature provided on a page provided the web server 112 that allows the consumer 102 to provide a form of payment for purchasing the goods or services, such as a payment card. For simplicity, a "payment card" or "payment vehicle" generally refers to any type of financial alternative to currency, such as credit cards, debit cards, smart cards, single-use cards, pre-paid cards, and the like. The payment system 114 of the online merchant 110 processes the payment transaction through communications with a payment network 100. An online merchant 110 generally uses a different bank or financial institution 140 than the consumer 102. An acquirer processor 130 handles the financial transactions necessary to transfer payment from the financial institution 140 associated with the consumer 102 to the financial institution 140 associated with the online merchant 110. The payment system 114 sends a payment request across a network 120 to the acquirer processor 130. The acquirer processor 130 requests an electronic transfer of funds from the financial institution 140 associated with the payment vehicle of the consumer 102, and settles the received funds to the financial institution 140 associated with the online merchant 110, less certain fees for performing the transaction.

New payment modalities for purchasing goods and services enable consumers 102 to pay using forms of payment other than the traditional cash, check, or payment card. For example, online vendors accept payments via third party payment providers, that also can be third party payment processors. Example third party payment providers include, but are not limited to ApplePay™, Android Pay™, PayPal™, and Samsung Pay™ among other suitable third party payment providers. Consumers 102 can pay for goods and services using their mobile computing device, such as an iPhone™ from Apple™, or an Android™ based smartphone. Many third party payment providers use digital wallets. Digital wallets provide flexibility to consumers 102, allowing consumer 102 to choose their preferred form of payment from one or more accounts configured and saved in their digital wallet. For example, for any transaction, consumers 102 can choose whether to pay from a payment card, bank account, or line of credit in their digital wallet. These new payment types can be beneficial to consumers 102 and online merchants 110 alike. Consumers 102 can benefit from the convenience of using mobile payment systems. Online merchants 110 can benefit from more economical transaction costs offered by third party payment providers.

In exchange for their payment processing services, online merchants 110 pay fees to various entities of the payment network 100, such as acquirer processors 130 and financial institutions 140, as well as associations associated with payment network 100 such as VISA™ and MASTERCARD™ among others. The fees can include a fixed fee as well as a fee based on the amount of the transaction. A typical fee can comprise an interchange fee, paid to the merchant's bank, the consumer's bank, and the credit card association, and a passthrough fee paid to the acquirer processor. The passthrough fee is also called an add-on rate or discount rate. The amount of the fees can be set by regulation, in the case of debit cards, or by agreement. For example, for a $100 transaction, fees can range from about $0.26 to over $2.50 depending upon the type of payment method. For a debit card transaction, the fee can comprise a $0.05 passthrough fee and a $0.21 interchange fee. However, for a credit card transaction, the fees can be set according to an agreement with the merchant. An example $100 credit card transaction fee can comprise a $0.50 passthrough fee paid to the acquirer processor, and a $2.00 interchange fee, of which $1.75 is paid to the consumer's bank, $0.07 is paid to the merchant's bank, and $0.18 is paid to the credit card association. The fees are typically deducted from the amount settled to the merchant. So if an online merchant 110 processed the $100 transaction, the consumer 102 would have $100 deducted from their account, but the merchant only receives $97.50 in settled funds ($100 less the passthrough fee and interchange fee).

Further, the fees can be different for different financial institutions, different payment network associations, different payment amounts, and/or different merchants. Therefore, online merchants 110 can financially benefit by steering the consumer 102 to use a form of payment that has lower transaction fees.

Figure 2:
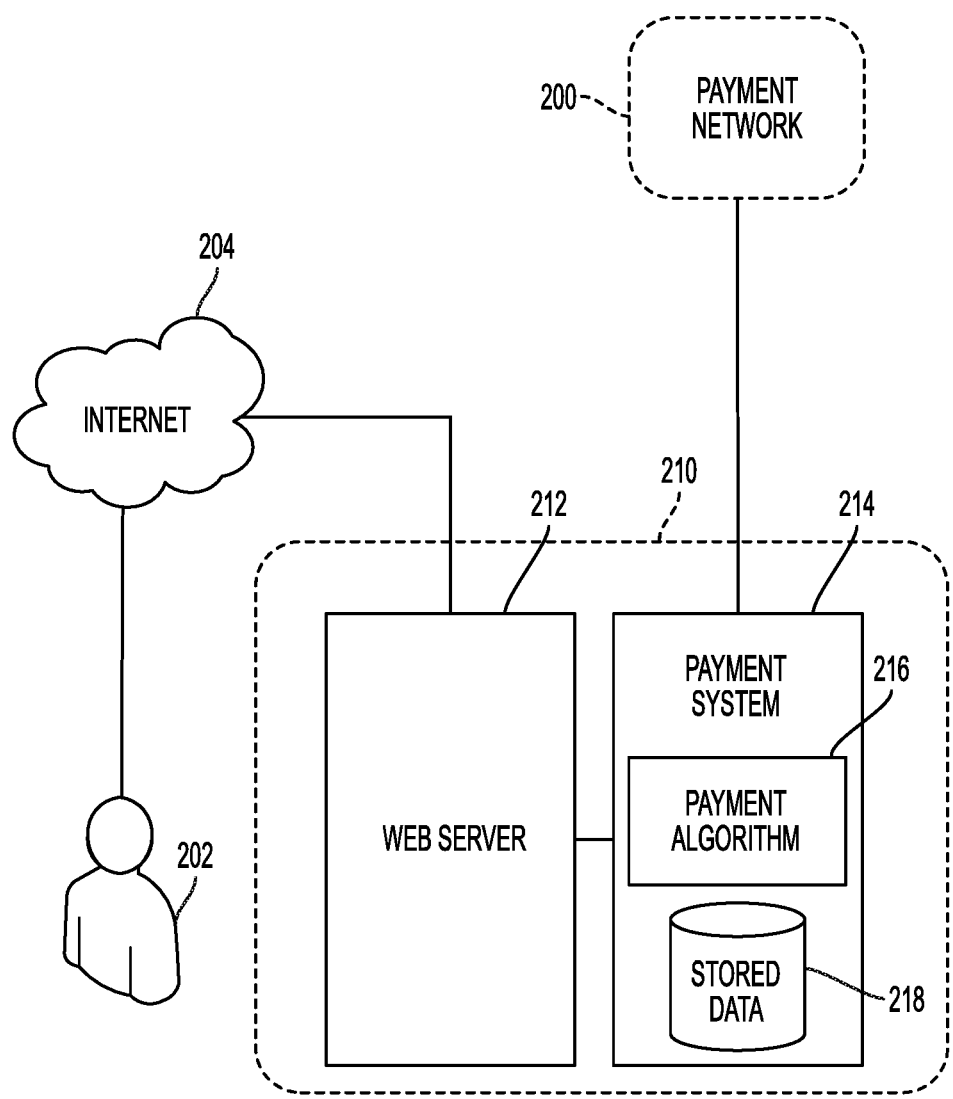
FIG. 2 is a block diagram of a merchant payment steering system.

Referring to FIG. 2, an embodiment of a system and method for payment tender steering is illustrated. In the example system and method, a consumer 202 desires to purchase goods or services from an online merchant 210. To view the goods or services of the online merchant 210, the consumer 202 opens a web browser, executes an application on a computer, or executes a mobile application or mobile app, and views web pages served by a web server 212 of the online merchant 210. Other suitable means of viewing and selecting items from the online merchant 210, including passthrough orders from other vendors, are also contemplated as would be understood by one of ordinary skill in the art.

Once a consumer 202 has selected the desired goods or services, the consumer 202 requests to checkout and pay for the goods or services from the online merchant 210. Depending on the online merchant 210, the consumer 202 can checkout as guest, create a user account and enter payment method information that optionally can be saved for future purchases, or log into an existing account and use payment information previously saved and associated with a consumer profile that can be stored in a database 218. If the consumer 202 has logged into a saved account, the payment system 214 can retrieve previously stored payment methods from the database 218. Payment method information can include bank account information, as well as bank identification numbers, expiration dates, tokens, and card security coders of one or more payment cards, and any other suitable information.

Figure 3:
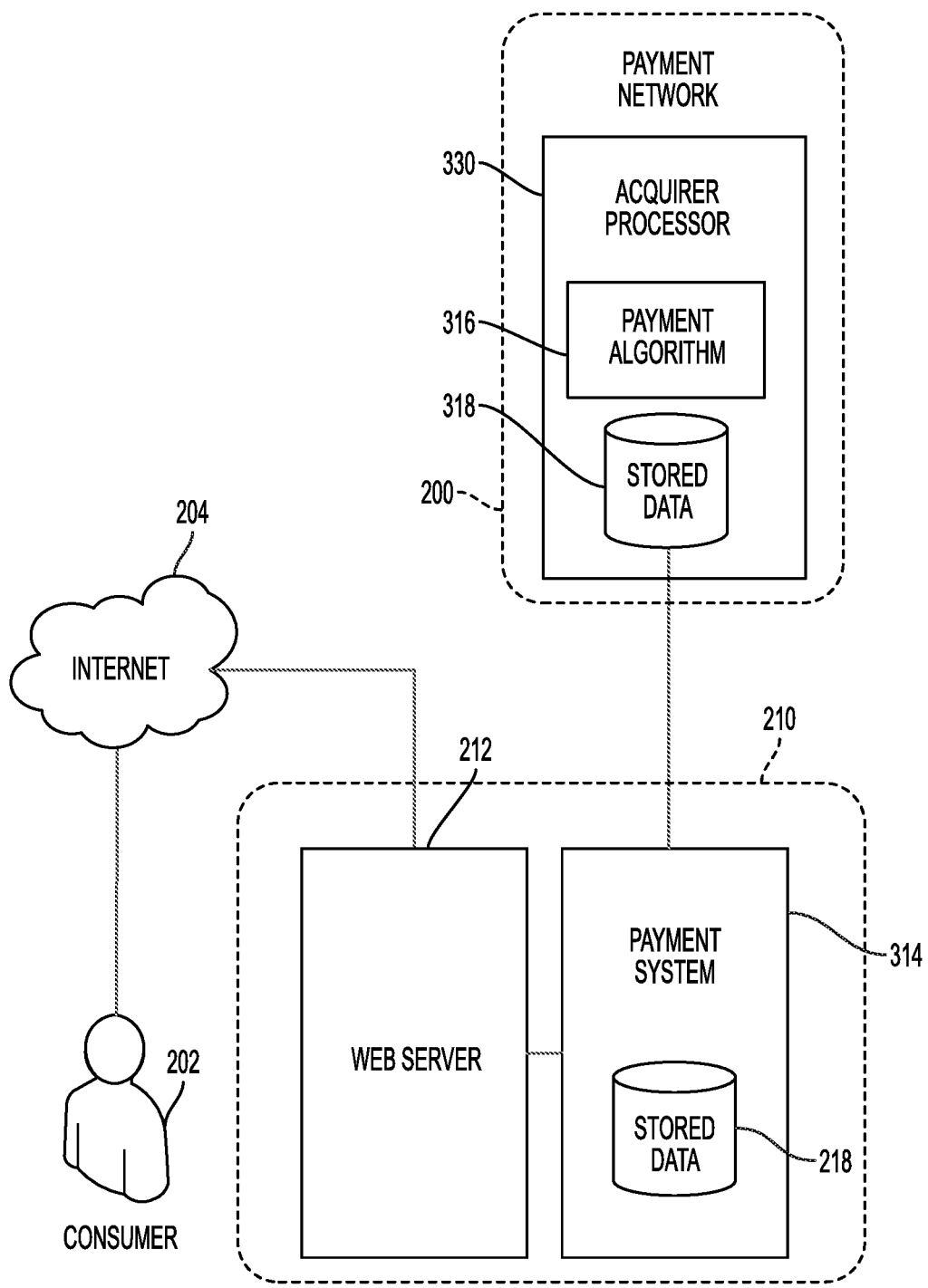
FIG. 3 is a block diagram of an acquirer processor payment steering system.

Although the payment system 214 and payment algorithm 216 are illustrated in FIG. 2 as being associated with the merchant 210, this is shown only for purposes of exposition only. As described below with regard to FIG. 3 and other embodiments, the payment system and payment algorithm can reside on different platforms, for example the acquirer processor as illustrated in FIG. 3 and described in the accompanying detailed description.

A payment system 214 of the online merchant 210 receives the amount of the transaction, inclusive of any tax and shipping and handling charges. A payment algorithm 216, executing on the payment system 214 can determine the fees that would be charged to complete the transaction using one or more of the payment methods available to the consumer 202. Generally, fees for using the payment network 200 are known in advance to the merchant 210 and are based on an agreement between the merchant 210 and the acquirer processor. Therefore, the payment algorithm can determine the cost of performing the transaction using each of, or a subset of, the payments methods stored in the database 218 that have been saved in the user account of the consumer 202.

The payment algorithm 216 can sort the payment methods using any suitable criteria. In one embodiment, payment methods can be sorted by transaction costs, from lowest to highest, or from highest to lowest. The payment algorithm 216 can steer the consumer 202 towards using the payment method that has a lower transaction cost to the merchant 210, as described below. In other suitable embodiments, the payment algorithm 216 can apply weighted algorithms or other algorithms to maximize the benefit to the online merchant 210, the consumer 202, or both. In various embodiments, the payment algorithm 216 can use information about transaction costs, card benefits to consumers 202, loyalty benefits, and other information to sort the methods of payment. For example, if online merchants 210 receive transaction fee discounts upon reaching certain dollar levels with a particular financial institution or payment network 200, it could benefit the online merchant 210 to steer transactions to that particular financial institution or payment network 200 in order to reach those discount levels, even if the transaction cost for a particular transaction would be slightly higher than using another financial institution or payment network 200. In another example, the payment algorithm 216 can determine that a consumer 202 would obtain better perks or loyalty rewards using one form of payment over another. The payment algorithm 216 can use weighted algorithms to sort a subset of payment methods based on how they benefit the consumer 202, particularly if there is no difference in transaction fees to the online merchant 210 for a particular subset of payment methods.

The online merchant 210 can optionally steer the consumer 202 to one or more payment options. For example, the online merchant 210 can steer the consumer 210 to use a payment option that has the lowest transaction cost for the online merchant 210. The online merchant 210 can steer the consumer in any suitable way. For example, the online merchant 210 can steer the consumer 202 by pre-populating the checkout information with the payment method that has the lowest transaction cost for the online merchant 210. In another example, the online merchant 210 can suggest or recommend a particular form of payment to the consumer 202. In yet another example, the online merchant 210 can offer an incentive to the consumer 202 in return for selected a particular form of payment. For example, the online merchant 210 can offer loyalty rewards, a discount coupon for use with a future purchase, a coupon or discount that can immediately be applied to the purchase, a free or discounted piece of merchandise, or any other suitable incentive. In an embodiment, payment tender steering can be governed by laws and regulations of the jurisdiction of the online merchant 210, the consumer 202, or a selected jurisdiction.

If the consumer 202 agrees to be steered to a particular payment method, then the transaction can be completed by the payment system 210 with the payment network. If the consumer 202 does not agree to be steered to a particular payment method, the consumer can 202 select from other available payment methods or enter new payment information.

Similarly, if the consumer 202 does not have payment information stored in a user account in the database 218 of the payment system 214, the payment system 214 can prompt the user to enter payment information for the purchase, and the consumer can enter payment information. In an embodiment, if the consumer 202 has previously paid for goods or services with the online merchant 202, the online merchant 202 may have stored information about the previous transaction in the user account in the database 218. The payment system 214 can optionally retrieve that information and determine if the transaction costs would be less using the form of payment last used by the consumer 202. The online merchant 210 can attempt to steer payment tender as described above by recommending that the consumer 202 use the previous payment method. For example, if the last four digits of a payment card were retained by the payment system 214 in the database 218, those digits and the type of payment card (e.g., VISA™, MASTERCARD™) can be used to steer the payment tender of the consumer 202.

If the consumer 202 selects to use a payment from a third party payment provider as described above, then the payment system 214 can determine the transaction costs associated with using one or more of the forms of payment available to the consumer 202 using the third party payment provider. Based on the determined transaction costs, the online merchant can steer the payment tender of the consumer 202 to a desired form of payment, as described above, to achieve the desired benefits.

Referring to FIG. 3, another embodiment of a system and method for payment tender steering is illustrated. In this embodiment, which is similar to that of FIG. 2, the payment algorithm 316 resides in the acquirer processor 330. The payment algorithm 316 of the acquirer processor 330 receives transaction information from the payment system 314 of the online merchant 210. The transaction information can include the transaction amount as well as information associated with the consumer 202. The payment algorithm 316 determines anticipated transaction costs associated with available payment methods of the consumer 202 and steers payment tender of the consumer 202.

In a configuration, the payment algorithm 316 can steer payment tender of the consumer 202 in real time. For example, as the consumer 202 is entering the digits of the payment card (the BIN, or bank identification number) the payment algorithm 316 can determine the type of payment card that the consumer 202 is attempting to use. The payment algorithm 316 can determine the anticipated transaction cost for the payment card and determine whether payment card is the optimal card type for the particular transaction or whether the consumer 202 should be steered to a different payment vehicle. The transaction cost data for different payment vehicle types can be stored in a database 318 and accessed by the payment algorithm 316.

In a configuration, information about the consumer 202 can be stored in the database 318. For example, tokenized information about the consumer 202 such as payment cards associated with the consumer 202 can be securely stored in the database 318. In a configuration, the payment algorithm 316 can use stored consumer information from the database 318 to steer payment tender of the consumer 202 to a particular payment vehicle.

In other embodiments, the merchant can be a brick-and-mortar merchant, and the payment steering can be performed at the point of sale (POS) register when the consumer 202 checks out in person at the merchant's store. In still other embodiments, the payment algorithm 316 can reside on different platforms, such as third party systems, and provide transaction cost information to the online merchant 210, the acquirer processor 330, or other entities. In alternative embodiments, payment tender steering can be accomplished by sending communications to the consumer 202 directly. For example, if a consumer 202 starts a checkout process using a digital wallet or attempts to make a payment using a third party payment provider, a payment algorithm 316 can prompt the digital wallet provider or third party payment provider to send a communication to the consumer 202 directly to effect payment steering. For example, an instant message using SMS, MMS or another suitable instant messaging platform can be sent to the consumer 202. In another example, an email can be directed to one or more email addresses associated with the consumer 202. In other embodiments, payment tender steering can accompany other communications sent to the consumer 202. For example, payment tender steering can accompany user authentication communications, or checking in at brick-and-mortar merchants. Other communications methods and message types also could be used, as would be understood by one of ordinary skill in the art.

Figure 4:
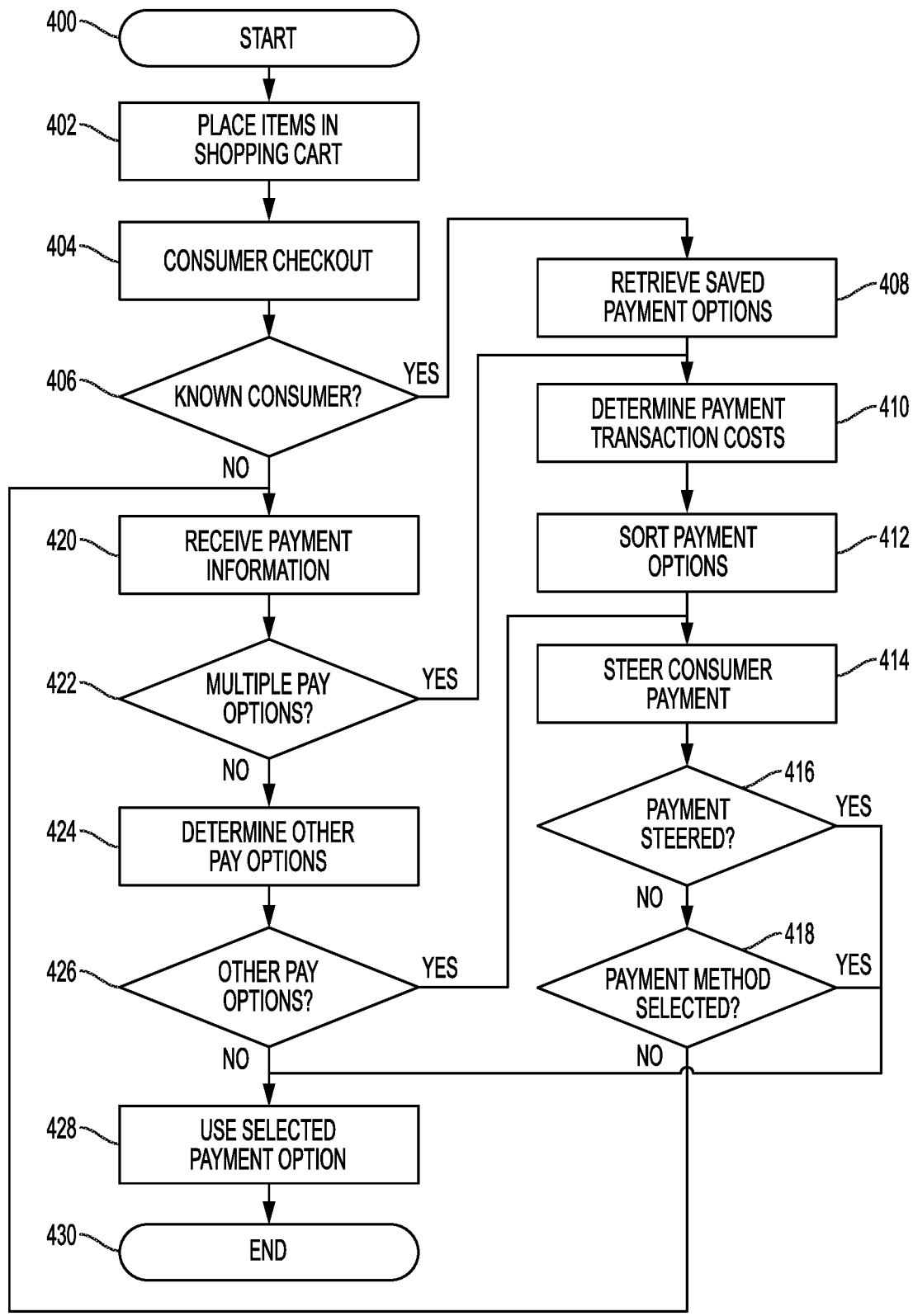
FIG. 4 is a flow diagram of an example process for a payment steering system.

Referring also to FIG. 4, an example flow diagram of an embodiment of a payment steering system is presented. Processing begins at start block 400 and continues to process block 402.

At process block 402, a consumer places items, or selects services to be ordered, into a virtual shopping cart of the online merchant. For example, a consumer can be served web pages from a web server, such as an online merchant's web server, that describe products or services that the consumer can order from the online merchant. Processing continues to process block 404.

At process block 404, the consumer selects a checkout feature that directs the consumer to a web page or other suitable interface for making a payment to the online merchant for the selected goods or services. Depending upon the checkout requirements of the online merchant, the consumer can be directed to log into an existing account (if the consumer has not already logged into their account with the online merchant) or checkout as a guest. Processing continues to process block 406.

At decision block 406, if the consumer has set up an account, or if the consumer's payment information is otherwise known, then processing continues to process block 408, otherwise processing continues to process block 420. For example, the consumer may have previously set up an account with the online merchant and saved payment information with the online merchant. Alternatively, information about the consumer may be recognized by the acquirer processor, for example if the consumer has previously purchased items from the merchant and a token has been generated based on the previous transaction.

At process block 408, the payment system can retrieve information about the consumer's methods of payment, such as bank card numbers identified with the consumer. In various configurations, consumer information can be stored by the merchant, the acquirer processor, or any other suitable system. Processing continues to process block 410.

At process block 410, the payment system can determine the payment transaction costs that would be incurred by the online merchant for each method of payment available to the consumer. As described above, the payment transaction cost for each method of payment can be dependent upon the amount to be charged, the merchant type, the merchant's volume, among other parameters, and can include a fixed transaction cost independent of the amount to be charged. Processing continues to process block 412.

At process block 412, the payment system can sort the consumer's available methods of payments using any suitable criteria. For example, the methods of payment can be sorted from lowest transaction costs to highest transaction costs, or the reverse. In this way, the payment system can determine the lowest transaction costs and steer consumers towards using payment options having the lowest transaction costs. In other suitable embodiments, the payment system can apply weighted algorithms or other algorithms to maximize the benefit to the online merchant, the consumer, or both. In various embodiments, the payment system can use information about transaction costs, card benefits to consumers, loyalty benefits, and other information to sort the methods of payment. For example, if online merchants can receive transaction fee discounts upon reaching certain dollar levels with a particular financial institution or financial network, it could benefit the online merchant to steer transactions to that particular financial institution or financial network in order to reach those discount levels, even if the transaction cost for that particular transaction would be slightly higher than using another financial institution or financial network. In another example, the payment system can determine that a consumer would obtain better perks or loyalty rewards using one form of payment over another. The payment system can use weighted algorithms to sort payment methods to benefit the consumer, particularly if there is no difference in transaction fees to the online merchant. Processing continues to process block 414.

At process block 414, the consumers can be steered to one or more payment options. For example, the consumer can be steered to use a payment option that has the lowest transaction costs for the online merchant. The consumer can be steered in any suitable way. For example, the steering can comprise pre-populating the checkout information with the payment method that has the lowest transaction cost for the online merchant. In another example, the consumer can be prompted with a suggestion or recommendation to use a particular payment vehicle or form of payment. In yet another example, the online merchant can offer an incentive to the consumer in return for selected a particular form of payment. For example, the online merchant can offer loyalty rewards, a discount coupon for use with a future purchase, a coupon or discount that can immediately be applied to the purchase, a free or discounted piece of merchandise, or any other suitable incentive. The payment tender steering options can be governed by laws and regulations of the jurisdiction of the online merchant, the consumer, or a selected jurisdiction. Processing continues to decision block 416.

At decision block 416, if the consumer agrees to be steered to a particular payment method then processing continues to process block 428 to use the steered payment method as the selected payment, otherwise processing continues to decision block 418.

At decision block 418, if no payment method has been selected, then processing returns to process block 420 for the consumer to enter a method of payment, otherwise if a payment method has been selected, then processing continues to process block 428.

At process block 420, the consumer can enter a method of payment to pay for the goods or services of the online merchant. For example, a consumer can enter a bank card number (a BIN, or bank identification number), or the consumer can select to use a digital wallet or third party payment processor, as described above. Depending upon the payment information entered by the consumer, there may be one or multiple methods of payment available to the consumer. For example the various methods of payment available to the consumer can be stored in a consumer profile in a database of the online merchant or the acquirer processor. In a configuration, an acquirer processor can determine payment vehicles available for use by the consumer, for example using tokens generated during previous transactions. Processing continues to decision block 422.

At decision block 422, if multiple different payment methods are available to the consumer as described above in decision block 420, then processing continues to process block 410 to determine the transaction costs for each of the available payment methods as described above for process block 410, and processing thereafter continues to the sorting and steering of process blocks 412 and 414. Otherwise, processing continues to process block 424.

At process block 424, the payment system can optionally determine if any additional payment options are available to the consumer. For example, the consumer can be prompted to open up a line of credit or a credit card associated with the online merchant. In another example, the online merchant may have previously processed a transaction with the consumer using a different payment method. Even if the online merchant did not store the particular bank card number, the payment system may be able to determine what the payment transaction fees would be if the user were to use that payment method again. Processing continues to decision block 426.

At decision block 426, if a preferential payment method can be identified with the consumer, then processing optionally can return to processing block 414 to attempt to steer the consumer to that payment method, otherwise processing continues to process block 428.

At process block 428, the payment system processes the payment transaction using the consumer's selected payment method. Processing then terminates at end block 430.

Figure 5:
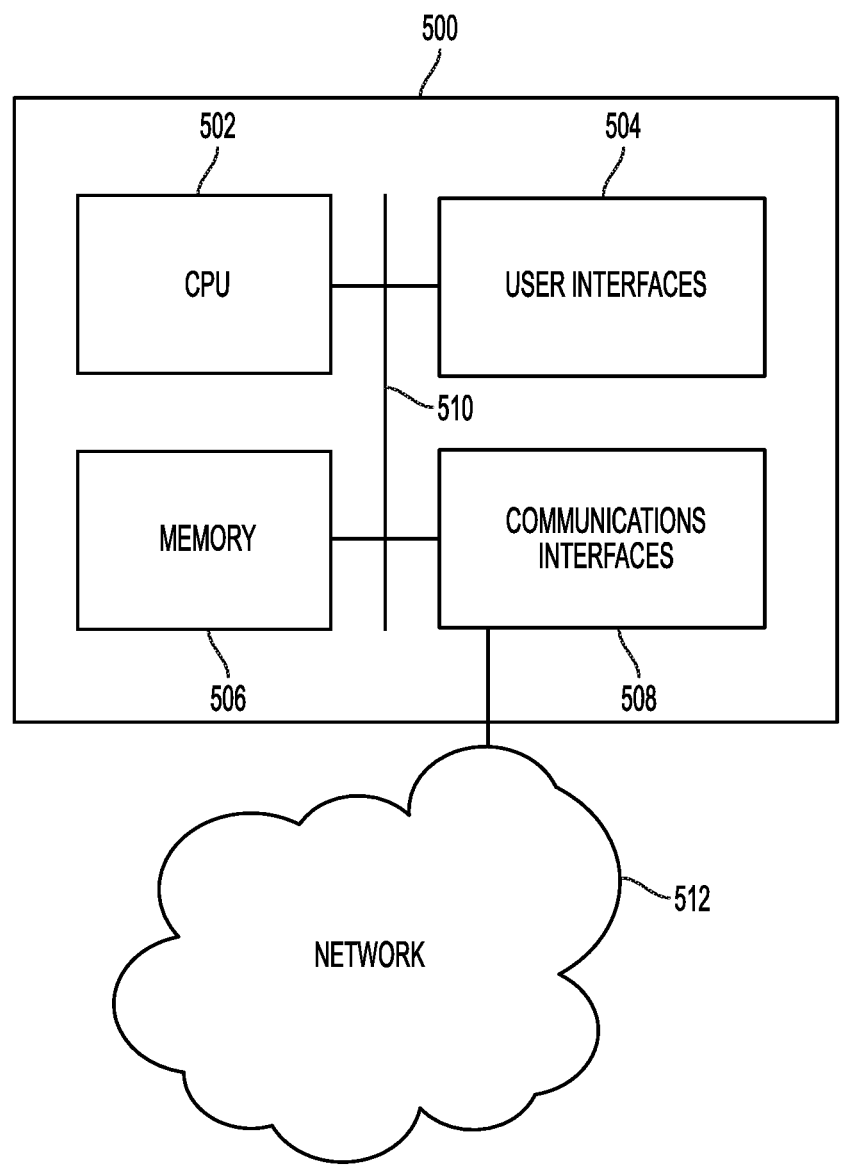
FIG. 5 is a block diagram of an example computing device.

The systems and processes described above can be performed on or between one or more computing devices 500. Referring now to FIG. 5, an example computing device 500 is presented. A computing device 500 can be a server, a computing device that is integrated with other systems or subsystems, a mobile computing device such as a smart phone, a cloud-based computing capability, and so forth. The computing device 500 can be any suitable computing device as would be understood in the art, including without limitation, a custom chip, an embedded processing device, a tablet computing device, a point of sale terminal 212 associated with a merchant 210, a back office system of a merchant 210, a personal data assistant (PDA), a desktop, a laptop, a microcomputer, a minicomputer, a server, a mainframe, or any other suitable programmable device. In various embodiments disclosed herein, a single component can be replaced by multiple components and multiple components can be replaced by a single component to perform a given function or functions. Except where such substitution would not be operative, such substitution is within the intended scope of the embodiments.

The computing device 500 includes a processor 502 that can be any suitable type of processing unit, for example a general purpose central processing unit (CPU), a reduced instruction set computer (RISC), a processor that has a pipeline or multiple processing capability including having multiple cores, a complex instruction set computer (CISC), a digital signal processor (DSP), an application specific integrated circuits (ASIC), a programmable logic devices (PLD), and a field programmable gate array (FPGA), among others. The computing resources can also include distributed computing devices, cloud computing resources, and virtual computing resources in general.

The computing device 500 also includes one or more memories 506, for example read only memory (ROM), random access memory (RAM), cache memory associated with the processor 502, or other memories such as dynamic RAM (DRAM), static ram (SRAM), programmable ROM (PROM), electrically erasable PROM (EEPROM), flash memory, a removable memory card or disk, a solid state drive, and so forth. The computing device 500 also includes storage media such as a storage device that can be configured to have multiple modules, such as magnetic disk drives, floppy drives, tape drives, hard drives, optical drives and media, magneto-optical drives and media, compact disk drives, Compact Disk Read Only Memory (CD-ROM), Compact Disk Recordable (CD-R), Compact Disk Rewriteable (CD-RW), a suitable type of Digital Versatile Disk (DVD) or BluRay disk, and so forth. Storage media such as flash drives, solid state hard drives, redundant array of individual disks (RAID), virtual drives, networked drives and other memory means including storage media on the processor 502, or memories 506 are also contemplated as storage devices. It can be appreciated that such memory can be internal or external with respect to operation of the disclosed embodiments. It can be appreciated that certain portions of the processes described herein can be performed using instructions stored on a computer-readable medium or media that direct a computer system to perform the process steps. Non-transitory computer-readable media, as used herein, comprises all computer-readable media except for transitory, propagating signals.

Network and communication interfaces 508 can be configured to transmit to, or receive data from, other computing devices 500 across a network 512. The network and communication interfaces 508 can be an Ethernet interface, a radio interface, a Universal Serial Bus (USB) interface, or any other suitable communications interface and can include receivers, transmitter, and transceivers. For purposes of clarity, a transceiver can be referred to as a receiver or a transmitter when referring to only the input or only the output functionality of the transceiver. Example communication interfaces 508 can include wired data transmission links such as Ethernet and TCP/IP. The communication interfaces 508 can include wireless protocols for interfacing with private or public networks 512. For example, the network and communication interfaces 508 and protocols can include interfaces for communicating with private wireless networks such as a WiFi network, one of the IEEE 802.11x family of networks, or another suitable wireless network. The network and communication interfaces 508 can include interfaces and protocols for communicating with public wireless networks 508, using for example wireless protocols used by cellular network providers, including Code Division Multiple Access (CDMA) and Global System for Mobile Communications (GSM). A computing device 400 can use network and communication interfaces 508 to communicate with hardware modules such as a database or data store, or one or more servers or other networked computing resources. Data can be encrypted or protected from unauthorized access.

In various configurations, the computing device 500 can include a system bus 510 for interconnecting the various components of the computing device 500, or the computing device 500 can be integrated into one or more chips such as programmable logic device or application specific integrated circuit (ASIC). The system bus 510 can include a memory controller, a local bus, or a peripheral bus for supporting input and output devices 504, and communication interfaces 508. Example input and output devices 504 include keyboards, keypads, gesture or graphical input devices, motion input devices, touchscreen interfaces, one or more displays, audio units, voice recognition units, vibratory devices, computer mice, and any other suitable user interface.

The processor 502 and memory 506 can include nonvolatile memory for storing computer-readable instructions, data, data structures, program modules, code, microcode, and other software components for storing the computer-readable instructions in non-transitory computer-readable mediums in connection with the other hardware components for carrying out the methodologies described herein. Software components can include source code, compiled code, interpreted code, executable code, static code, dynamic code, encrypted code, or any other suitable type of code or computer instructions implemented using any suitable high-level, low-level, object-oriented, visual, compiled, or interpreted programming language.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

What is claimed is:

1. A method for electronic transaction steering for an electronic transaction for a payment for goods or services of an online merchant, the method comprising:
   receiving, by an electronic transaction processing system from a server or a point of sale terminal of the online merchant, transaction information including user information associated with a user;
   determining, by the electronic transaction processing system, anticipated electronic transaction costs associated with one or more electronic transaction methods for the electronic transaction based on the user information and the online merchant;
   determining, by the electronic transaction processing system, a recommended electronic transaction method from the one or more electronic transaction methods based on the anticipated electronic transaction costs and account information associated with the one or more electronic transaction methods of the user; and
   steering, by the electronic transaction processing system, the user to the recommended electronic transaction method by pre-populating checkout information with the recommended electronic transaction method,
   wherein the account information associated with the one or more electronic transaction methods of the user further comprises one or more of:
   account information of the user received from a third party transaction provider; and account information from a digital wallet associated with the user, and
   wherein the electronic transaction processing system is a system of one or more of the online merchant and an acquirer processor.

2. The method of claim 1, wherein the steering further comprises offering one or more of a consumer incentive, a loyalty reward, a discount coupon, a free item of merchandise, or a discounted item of merchandise.

3. The method of claim 1, further comprising:

processing, by the electronic transaction processing system and with the acquirer processor, the electronic transaction for the goods or the services using the recommended electronic transaction method.

4. A system for electronic transaction steering for an electronic transaction for a payment for goods or services of an online merchant, comprising:

at least one processor; and at least one storage comprising computer-readable instructions which, when executed by the at least one processor, cause the at least one processor to perform operations comprising:

receiving, from a server or a point of sale terminal of the online merchant, transaction information including user information associated with a user;

determining anticipated electronic transaction costs associated with one or more electronic transaction methods for the electronic transaction based on the user information and the online merchant;

determining a recommended electronic transaction method from the one or more electronic transaction methods based on the anticipated electronic transaction costs and account information associated with the one or more electronic transaction methods of the user; and steering the user to the recommended electronic transaction method by pre-populating checkout information with the recommended electronic transaction method, wherein the account information associated with the one or more electronic transaction methods of the user further comprises one or more of:

account information of the user received from a third party transaction provider; and account information from a digital wallet associated with the user, and wherein the system is a system of one or more of the online merchant and an acquirer processor.

5. The system of claim 4, wherein the steering further comprises offering one or more of a consumer incentive, a loyalty reward, a discount coupon, a free item of merchandise, or a discounted item of merchandise.

6. The system of claim 4, wherein the operations further comprise:

processing, with the acquirer processor, the electronic transaction for the goods or the services using the recommended electronic transaction method.

7. A non-transitory computer-readable medium storing instructions which, when executed by at least one processor, cause the at least one processor to perform operations for electronic transaction steering for an electronic transaction for a payment for goods or services of an online merchant, the operations comprising:

receiving, from a server or a point of sale terminal of the online merchant, transaction information including user information associated with a user;

determining anticipated electronic transaction costs associated with one or more electronic transaction methods for the electronic transaction based on the user information and the online merchant;

determining a recommended electronic transaction method from the one or more electronic transaction methods based on the anticipated electronic transaction costs and account information associated with the one or more electronic transaction methods of the user; and steering the user to the recommended electronic transaction method by pre-populating checkout information with the recommended electronic transaction method, wherein the account information associated with the one or more electronic transaction methods of the user further comprises one or more of:

account information of the user received from a third party transaction provider; and account information from a digital wallet associated with the user, and wherein the at least one processor is a part of a system of one or more of the online merchant and an acquirer processor.

8. The non-transitory computer-readable medium of claim 7, wherein the steering further comprises offering one or more of a consumer incentive, a loyalty reward, a discount coupon, a free item of merchandise, or a discounted item of merchandise.

9. The non-transitory computer-readable medium of claim 7, wherein the operations further comprise:

processing, with the acquirer processor, the electronic transaction for the goods or the services using the recommended electronic transaction method.

\* \* \* \* \*